United States Patent [19]

Strader

[11] Patent Number: 4,855,348

[45] Date of Patent: Aug. 8, 1989

[54] AQUEOUS, SILICONE-CONTAINING COATING COMPOSITION FOR HIGH TEMPERATURE APPLIANCES

[75] Inventor: Hartzel G. Strader, Miamisburg, Ohio

[73] Assignee: DAP Inc., Tipp City, Ohio

[21] Appl. No.: 219,012

[22] Filed: Jul. 14, 1988

[51] Int. Cl.$^4$ .................................................. C08K 5/10
[52] U.S. Cl. ..................................... 524/317; 524/320; 524/322; 524/364; 524/376; 524/378; 524/357; 524/561; 524/588; 524/755; 524/759; 524/760; 524/767; 524/770; 524/772; 524/773; 428/447; 428/450; 427/387; 427/388.1
[58] Field of Search .............. 524/322, 378, 364, 357, 524/561, 317, 320, 376, 588, 755, 759, 760, 770, 767, 773, 772

[56] References Cited

U.S. PATENT DOCUMENTS 4,578,415  3/1986  Learner ............................... 524/322

OTHER PUBLICATIONS

"Information about Silicone Resins" Technical Brochure; Dow Corning Corporation; 1980.
"Wacker Silicone Intermediate SY308" Technical Brochure SME 10-162.828; Wacker–Chemie GmbH; 1982.
"Silicone Resins for Paints & Coatings" Technical Brochure, General Electric Company, undated.

*Primary Examiner*—Melvyn I. Marquis
*Attorney, Agent, or Firm*—Robert M. Didrick; Robert H. Robinson

[57] ABSTRACT

A storage stable water-based paint comprising a solid silicone resin and an ammonium salt of a drying oil modified acrylic copolymer provide a coating for barbecue grills and other appliances that are subjected to temperatures as high as 1300° F. A smooth and continuous coating remains on the metal after burning off of the acrylic resin and firing of the metal at 1300° F. The paint is redispersible and may be drawn down to 1.5 mils after storage at 120° F. for more than 3 months when the pH is at least about 8.

10 Claims, No Drawings

AQUEOUS, SILICONE-CONTAINING COATING COMPOSITION FOR HIGH TEMPERATURE APPLIANCES

FIELD OF THE INVENTION

This invention relates to an aqueous composition for coating stoves, barbeque equipment and other appliances that are subjected to high temperatures. It relates particularly to a waterborne combination of a solid silicone resin and an acrylic copolymer which has a long shelf life and leaves an intact coating on the appliance after having undergone temperatures as high as 1300° F.

BACKGROUND OF THE INVENTION

Silicone resins have been noted since their introduction for their ability to withstand high temperatures. This property has been utilized in alkyd and acrylic paints containing volatile organic solvents for many years. But the use of such paints is being restricted more and more by legislation in many states, led by California, which severely limits the amount of such solvents, particularly the photochemically reactive solvents, that may be used in paints.

There is a need, therefore, for a silicone-containing paint having a low content of volatile organic solvents that has a long shelf life, is easily applied by brush or spray, gives good coverage, and provides a coating after exposure to high temperatures that is smooth and continuous.

A storage stable aqueous aerosol coating composition is taught by Learner in U.S. Pat. No. 4,578,415. The sole binder in that composition is a water soluble ammonium salt of a drying oil-modified, low molecular weight acrylic copolymer.

Now, it has been discovered that a stable solution of a solid silicone and the acrylic copolymer of Learner can be made and that the silicone will survive the curing of a paint made from the solution and the burning of the acrylic component to provide a protective coating on a barbeque grill or the like at temperatures up to about 1300° F. (about 700° C.).

It is an object of this invention to provide an aqueous coating composition containing a solid silicone resin in solution that is stable at room temperature for as long as 18 months and for five months at 120° F.

It is a further object of this invention to provide an aqueous coating composition comprising an acrylic resin binder that is burned off from the substrate at a high temperature and a silicone binder that provides an unbroken film on the substrate at still higher temperatures.

BRIEF SUMMARY OF THE INVENTION

These and other objects of the invention which will become apparent from the following description are achieved by an aqueous composition comprising a solid silicone resin; a water soluble ammonium or amine salt of a drying oil-modified copolymer of an alkyl acrylate and an alkyl methacrylate wherein the alkyl groups of each have from 3 to 5 carbon atoms, said copolymer having an average molecular weight of not more than about 9000; a water soluble organic solvent; and water.

DETAILED DESCRIPTION OF THE INVENTION

The solid silicone resin provides a film on a metal substrate that remains intact after the burning off of the modified acrylic resin of the paint when a stove or barbeque equipment coated therewith is heated initially to about 400° F. and then further to about 1300° F. Despite the disruption of the original film by the burning off and the chemical reactions that occur during the burning, the silicone retains its cohesiveness and its adhesion to the metal so that the film on the metal is smooth, continuous, and of substantially the same color as the original coating before the burn off.

The paint composition contains from about 4% to about 10% of the silicone resin by weight of the total weight of the composition. Preferably, the silicones content will be from about 6% to about 9%. As a percentage of the solids weight, the silicone is from about 15% to about 25%.

A presently preferred silicone resin is a silanol-functional polysiloxane having a molecular weight in the range of from about 1000 to about 2000 and a hydroxyl content of from about 2% to about 8% by weight. The resin has alkyl ($C_1$ to $C_4$) and phenyl substituents on the silicon-oxygen matrix that forms the backbone of the polysiloxane. Preferably, the resin is in the form of flakes as supplied by Wacker Chemie Gmb H under the name Wacker Silicone Intermediate SY 308. A solution of a silanol-functional phenyl methyl polysiloxane in xylene (Wacker Silicone Intermediate SY 409) is less preferred because of the nature of the solvent.

Another silanol-functional, solid silicone resin which is suitable for this invention is Dow Corning's Z-6018 Intermediate, which also is supplied in flake form. It is a low molecular weight resin having a hydroxyl content of 6.4% by weight.

Other solid silicones having the above-mentioned alkyl and phenyl substituents are exemplified by General Electric's SR 165, an 85% solution of a methyl phenyl silicone in VM&P naphtha; and Wacker Chemie's REM 50, a 50% solution of a methyl phenyl silicone in xylene and cyclohexane. A polydimethyl siloxane sold by Rhone-Poulenc as Rhodorsil emulsin 20878 is another solid silicone suitable for the composition of this invention.

From about 3% to 20% of the total weight of the paint composition is represented by the modified acrylic resin. Preferable compositions contain from about 3 to about 10% of this acrylic resin. Paints of this invention having an initial pigment volume concentration of from about 25% to about 40% give a film which, after burn off of the acrylic resin, has a PVC of from about 40% to about 60%, preferably from about 40 to about 45%.

The alkyl acrylate will comprise from 10% to about 35%, preferably from about 15% to about 30% by weight of the modified copolymer while the alkyl methacrylate may comprise from about 20% to about 70%, preferably from about 30% to about 60%, of its weight. Butyl acrylate and isobutyl methacrylate are preferred as the monomers in the copolymerization. The copolymers also comprise from about 10% to about 30% by weight of a copolymerized drying oil and from about 10% to about 20% of a copolymerized, olefinically unsaturated acid or anhydride. Linseed oil, soya oil, tung oil, and safflower oil are examples of the drying oil and the acid is exemplified by acrylic acid, methacrylic acid, fumaric acid, itaconic acid, and maleic anhydride.

The copolymer will have an average molecular weight of from about 1000 to about 9000, preferably up to about 3000, and more preferably up to about 2000.

It is presently preferred to use a solution of a drying oil modified butyl acrylate/isobutyl methacrylate copolymer in a mixture of isopropyl alcohol and n-propoxy propanol as the acrylic binder in the paint of this invention. It is sold under the trademark Acryloid and product code WR-748 by Rohm & Haas. This copolymer includes a carboxylic acid moiety which when neutralized by ammonia or an amine imparts water-solubility to the copolymer.

The amount of water in the composition may be from 30% to about 60% by weight of the total composition. Preferably, the amount of water is from about 40% to about 50%.

In addition to the water, the solvent system includes a water-soluble organic solvent such as the straight- and branched chain monohydric alcohols having from 1 to about 4 carbon atoms, glycol monoethers and monoesters, ketones, and the like. Examples of the organic solvents include methanol, ethanol, isopropanol, n-butanol, acetone, diacetone alcohol, mono-alkyl ethers of ethylene and propylene glycol having from one to about four carbon atoms in the alkyl moiety such as ethylene glycol monobutyl ether and propylene glycol monomethyl ether, and ethylene glycol mono-alkyl ether acetates having from 1 to about 4 carbon atoms in the alkylmoiety such as ethylene glycol monomethyl ether acetate.

A mixture of such solvents is suitable, especially mixtures of the low molecular weight polar organic solvent such as the mono-alkyl ethers and acetates of ethylene and propylene glycol. Generally, the water soluble organic solvent will account for from about 3% to about 15%, preferably from about 8% to about 10% of the total weight of the composition. The ratio of water to organic solvent may be from about 75:25 to about 70:30.

Water-solubility of the modified acrylic resin is provided by the neutralization of the carboxylic acid moiety with ammonia, an alkyl amine or heterocyclic amine having up to 6 carbon atoms or a mono-, di-, or trialkanol amine having from 1 to 6 carbon atoms in each alkanol group. To impart an acceptable shelf life to the paint of this invention, the pH must be at least about 8 and preferably is from about 8.5 to about 9. Therefore, an additional amount of ammonium hydroxide or the like must be added beyond the neutralization point.

Pigments and fillers are also important components of the paint composition of this invention. Because stove and barbeque paints are usually black, pigments such as carbon black, graphite and black iron oxide are preferred for this paint although it is contemplated that other colored pigments that are not reactive with the silicone resin at 1300° F. may be used. Suitably, there will be from about 5% to about 20%, preferably from about 9 to about 16%, by weight of pigment in the composition. Fillers such as talc and finely ground silica help to retain the initial black color of a barbeque paint after being fired at 1300° F. The total of these two may be in the range of from 4 to 10% of the total composition weight but the ratio of talc to silica should be no greater than about 2:1 by weight and is preferably from about 1:1 to about 1.3:1.

The paint composition may also include a surfactant, an anti-foam agent, an anti-rust agent, a plasticizer, drying agents, a pH stabilizer, and the like. When present, each of these additions may be constitute up to about 3% of the total weight but 1 or 2% is usually the maximum of each.

The following examples illustrate several embodiments of the invention claimed herein. All parts are by weight unless otherwise stated.

EXAMPLES 1-4

A grind paste made up of the compounds listed below was milled for 15 minutes in a Cowles dissolver having a 2-inch blade. Then, the letdown was mixed with the paste on a paint shaker and the mixture was finally milled to a Hegman grind of 5½ with glass beads.

|  | Example No. | | | |
|---|---|---|---|---|
| Grind Paste | 1 | 2 | 3 | 4 |
| Silicone resin* | 40.6 | 59.9 | 77.4 | 79.5 |
| Modified acrylic resin** | 95.0 | 139.5 | 63.6 | 128.6 |
| Carbon black | 9.6 | 14.0 | 18.1 | 12.9 |
| Black iron oxide (Mobay 805) | 74.0 | 108.6 | 140.3 | 100.0 |
| Talc | 26.5 | 38.8 | 50.2 | 35.8 |
| Silica | 21.2 | 31.1 | 40.2 | 28.6 |
| Butyl cellosolve | 38.3 | 57.8 | 83.3 | 27.7 |
| Water | 99.8 | 146.5 | 225.8 | 135.0 |
| Ammonium hydroxide (29° Be) | 2.4 | 3.5 | 4.5 | 3.8 |
| Other additives | 25.7 | 37.5 | 37.6 | 32.4 |
| Letdown | | | | |
| Cobalt drier (10%) | 0.5 | 0.7 | 0.6 | 0.6 |
| Water | 460.7 | 274.5 | 243.5 | 289.7 |
| Butyl cellosolve | 14.0 | 30.0 | — | 62.4 |
| Ammonium hydroxide (29° Be) | 2.6 | 3.9 | 5.0 | 3.7 |
| Other additives *** | 1.5 | 2.2 | 2.9 | 1.4 |
| Total | 912.4 | 948.5 | 993 | 942 |
| Paint | | | | |
| Viscosity (KU) | 49 | 68 | 61 | 68 |
| % Solids | 26.9 | 38 | 39 | 37.4 |
| PVC (%) | 28.7 | 28.7 | 39 | 26.3 |
| PVC after burn-off | — | 49 | 49 | 40 |
| pH | 8.2 | 8.0 | 9.0 | 8.2 |
| Water/Cosolvent ratio**** | — | — | — | 73.8:26.2 |

*Wacker SY-308
**Rohm & Haas Acryloid WR-748
***Wetting agents, defoamers, anti-rust agent
****Includes water and organic solvents from components Metal panels having a 1 mil coating of the paints of the above examples were fired at 1300° F. The appearance of the panels after firing is described in Table 1.

TABLE 1

| Example No. | Appearance | Rating |
|---|---|---|
| 1 | slight amount of flaking | Fair |
| 2 | | |
| 1st test | slight amount of flaking | Fair |
| 2nd test | very slight amount of flaking | Good |
| 3 | very slight amount of flaking | Good |
| 4 | no flaking, slight burnishing | Excellent |

In contrast to the above result, several paint compositions made with a silicone modified alkyl resin in place of the solid silicone, with and without the Acryloid WR-748 resin, failed badly when metal panels coated with them were fired at 1300° F. The silicone modified alkyd resin used is sold under the trademark Kelsol and product code 3970 by Spencer Kellogg. Representative formulaltions and test results are given in Table 2.

TABLE 2

|  | Formulations | | | | |
|---|---|---|---|---|---|
| Grind Paste | A | B | C | D | E |
| Kelso 3970 | 99.4 | 160.2 | 172.9 | 172.9 | 172.9 |
| Carbon black | 16.3 | 18.2 | 13.5 | 13.5 | 13.5 |

TABLE 2-continued

| Grind Paste | Formulations | | | | |
|---|---|---|---|---|---|
| | A | B | C | D | E |
| Black iron oxide | 126.3 | 140.3 | 96.5 | 96.5 | 96.5 |
| Talc | 45.2 | 50.2 | 30.0 | 30.0 | 30.0 |
| Silica | — | 40.1 | 27.5 | 27.5 | 27.5 |
| Water | 97.7 | 157.8 | — | — | — |
| Butyl cellosolve | 22.3 | 24.8 | 45.7 | 45.7 | 45.7 |
| Triethylamine | 5.6 | 8.7 | — | — | — |
| Anti-rust agent | 10.5 | 11.6 | — | — | — |
| Letdown | | | | | |
| Kelso 3970 | 196.8 | 168.8 | 51.4 | 51.4 | 51.4 |
| Triethylamine | 9.8 | 8.4 | — | — | — |
| Water | 331.0 | 276.0 | 387.4 | 387.4 | 387.4 |
| Butyl cellosolve | 16.2 | 69.0 | 46.5 | 46.5 | 46.5 |
| Acryloid WR-748 | — | — | 47.7 | 47.7 | 47.7 |
| Cobalt drier | 1.4 | 1.6 | 2.2 | 2.2 | 2.2 |
| Zirconium drier | — | — | — | 4.0 | — |
| Manganese drier | — | — | — | — | 3.0 |
| Activ-8 drier | — | — | 0.8 | — | — |
| Ammonium hydroxide | — | — | 14.0 | 14.0 | 14.0 |
| Defoamer | — | — | 4.5 | 4.5 | 4.5 |
| Rating of coated metal panel after firing at 1300° F. | | | | | |
| Brush coated | Failed | Failed | Failed | Failed | Failed |
| Spray coated | — | Passed | — | — | — |

EXAMPLES 5-10

The effect of pH on the stability of the paint composition of this invention during prolonged storage was investigated by preparing the primary composition of Example 5 given below and then adjusting the pH upwards by adding ammonium hydroxide to aliquot portions of the composition to prepare the composition of Examples 6-10. The compositions, pH, and the condition of the paint of Examples 6-10 after storage in metal cans for more than 3 months at 120° F. are given in Table 3.

| Primary composition (pH = 7.32) | |
|---|---|
| | Parts |
| WR-748 acrylic resin | 395 |
| SY-308 silicone resin | 245 |
| Carbon black | 40 |
| Black iron oxide (Mobay 805) | 308 |
| Talc | 110 |
| Silica | 88 |
| Butyl cellosolve | 275 |
| Water | 1296 |
| Ammonium hydroxide (29° Be) | 10.5 |
| Cobalt drier | 2 |
| Additives | 85 |

After slightly more than 3 months storage, the pH this paint was 7.14, there was a firm layer of solids at the bottom of the can and the can was slightly corroded. The solids would not redisperse.

TABLE 3

| Example No. | Parts of Ex. 5 Paint | Added NH$_4$OH | pH | Condition after storage |
|---|---|---|---|---|
| 6 | 450 | 3.4 | 7.71 | Crust on layer of solides, ph 7.78 |
| 7 | 450 | 5.5 | 8.13 | Gel on soft layer of solids, pH 8.33 Redispersible; drawdown bar 1.5 mils |
| 8 | 450 | 6.4 | 8.59 | Gel on soft layer of solids, ph 8.53 Redispersible, drawdown bar 1.5 mils |
| 9 | 450 | 7.4 | 8.8 | Good condition, soft layer of solids, pH 8.85 Redispersible, drawdown bar 1.5 mils |
| 10 | 450 | 8.7 | 8.83 | Good condition, soft layer of solids, pH 9.04 Redispersible, drawdown bar 1.5 mils |

It will thus be seen that the objects of this invention are efficiently attained and since certain changes may be made from the compositions described above without departing from the scope of the invention, it is intended that all matter in the above description shall be interpreted as being illustrative and not limitative.

The subject matter claimed is:

1. An aqueous coating composition comprising a solid silicone resin; a water soluble ammonium or amine salt of a drying oil-modified copolymer of an alkyl acrylate and an alkyl methacrylate, each of which having from 3 to 5 carbon atoms in the alkyl moiety thereof, said copolymer having an average molecular weight of not more than about 9000; a water soluble organic solvent, and water.

2. The composition of claim 1 characterized further in that the copolymer comprises a copolymerized unsaturated carboxylic acid.

3. The composition of claim 1 wherein the silicone resin has a silanol functional group.

4. The composition of claim 1 wherein the silicone resin is a polysiloxane having phenyl and propyl substituents.

5. The composition of claim 4 wherein the polysiloxane has a silanol functional group.

6. The composition of claim 1 wherein the silicone resin is a polysiloxane having methyl and phenyl substituents.

7. The composition of claim 6 wherein the silicone resin has a silanol functional group.

8. The composition of claim 1 characterized further by a pH of at least about 8.

9. The composition of claim 1 further characterized in that it is stable for at least about 3 months at 120° F.

10. The composition of claim 8 wherein the pH is from about 8.5 to about 9.

* * * * *